(12) United States Patent
Ali et al.

(10) Patent No.: US 10,198,284 B2
(45) Date of Patent: Feb. 5, 2019

(54) ENSURING OPERATIONAL INTEGRITY AND PERFORMANCE OF DEPLOYED CONVERGED INFRASTRUCTURE INFORMATION HANDLING SYSTEMS

(71) Applicant: Dell Products L.P., Round Rock, TX (US)

(72) Inventors: Rizwan Ali, Cedar Park, TX (US); Ravikanth Chaganti, Bangalore (IN); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 15/465,393

(22) Filed: Mar. 21, 2017

(65) Prior Publication Data
US 2018/0276019 A1 Sep. 27, 2018

(51) Int. Cl.
*G06F 9/46* (2006.01)
*G06F 9/455* (2018.01)
*G06F 17/30* (2006.01)
*G06F 11/14* (2006.01)

(52) U.S. Cl.
CPC ...... *G06F 9/45558* (2013.01); *G06F 11/1469* (2013.01); *G06F 17/30371* (2013.01); *G06F 2009/45562* (2013.01); *G06F 2009/45591* (2013.01); *G06F 2201/815* (2013.01)

(58) Field of Classification Search
CPC ............ G06F 9/45558; G06F 11/1469; G06F 17/30371; G06F 2009/45562; G06F 2009/45591; G06F 2201/815

USPC .......................................................... 718/1
See application file for complete search history.

(56) References Cited

U.S. PATENT DOCUMENTS 7,356,679 B1 * 4/2008 Le ..................... G06F 17/30067
713/1

\* cited by examiner

*Primary Examiner* — Camquy Truong
(74) *Attorney, Agent, or Firm* — Jackson Walker L.L.P.

(57) ABSTRACT

An operational integrity and performance validation module performs operational integrity operations, performance validation operations, or both. Operational integrity operations may include: accessing an operational integrity schema comprising a task manifest identifying operational tasks and a performance manifest including performance thresholds for the tasks. The OIPV module communicates with different types of infrastructure managers and each schema may be associated with a particular infrastructure manager. The OIPV module may invoke the applicable infrastructure manager to perform the applicable tasks. For each task, the module may poll the infrastructure manager for status information and record completion status and time-to-complete information. Performance validation operations may include accessing a performance validation manifest, configuring an image manifest of a benchmark image in accordance with the performance validation operations, deploying the benchmark image to a node under test and instructing an image agent of the benchmark image to execute performance tests according with the image manifest.

20 Claims, 7 Drawing Sheets

```
{
    "Infrastructure Operations" : {
        "IO_a08e9d40-189b-450e-a601-ffa8d8e03877" : {
            "Health Status Attributes" : {
301-1→      "VM Creation" : {
    302-1→      "TestVM1" : {
        303-1→      "CPU" : "2 vCPU",
        303-2→      "Memory" : "4 GB",
        303-3→      "Disk" : "50 GB",
        303-4→      "NIC" : [
                        "10 GB",
                    ],
                    "IP" : "172.16.100.17",
        303-5→      "Availability" : "Highly-Available"
                }
    302-2→      "Template" : {
                    "Name:" "Windows Server 2012 R2",
                }
    302-3→      "Threshold": {
                    "MaxTimeToCreate": "10 Mins",
                }
    302-4→      "VM Migration": {
                    "Migration Policy": "BestAvailable"
                    "MigrationTime" : "2 Mins",
                }
            },
301-2→      "VM Network Creation" : {
                "TestNetwork1" : {
                    "NetworkName" : "Test Tenant Network 1",
                    "IP Network": "172.16.0.0/25",
                    "Gateway" : "172.16.0.254"
                    "DNS" : "172.16.0.1"
                }
            },
            .
            .
            .
            .
            .
        }
    }
}
```

ENSURING OPERATIONAL INTEGRITY AND PERFORMANCE OF DEPLOYED CONVERGED INFRASTRUCTURE INFORMATION HANDLING SYSTEMS

TECHNICAL FIELD

The present disclosure relates in general to management of information handling systems and, more particularly, monitoring and ensuring operational integrity and validating performance characteristics of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The importance of information technology (IT), which refers to the use of information handling systems to acquire, access, analyze, generate, and transmit data, especially in the context of a business or other enterprise, has increased dramatically with the proliferation of broadband communication infrastructure, affordable and sophisticated network-aware mobile devices, computerized applications for business and consumers, and oceans of data generated by such applications. Data centers came into existence as enterprises heavily invested in IT quickly recognized the need to create specialized facilities and resources to house and manage information handling systems and related infrastructure and components.

The architecture of early data centers was generally silo-like or vertical, with IT resources implemented in a non-shared landscape for a specific and limited application or objective. Vertically oriented data centers typically resulted in high capital costs, high operating costs, low utilization, poor interoperability, ad hoc management, and one-dimensional security. Horizontal data centers, characterized by the use of at least some degree of virtualization and/or co-located data center facilities, evolved in response to scaling and cost issues inherent in the vertical data center model. While reducing costs and improving utilization, horizontal data centers inherited the fragmented nature of the original data centers, wherein processing resources are acquired separately from storage resources which are acquired separately from networking resources and so forth.

SUMMARY

A disclosed managed infrastructure platform includes features for managing information handling systems. Although applicable to all types of information handling system, disclosed features may be described in the context of converged infrastructure systems, hyper-converged infrastructure systems, hybrid cloud systems, and other types of enterprise-scale information handling systems, all of which may be collectively or generically referred to herein as managed infrastructure systems. Managed infrastructure systems address various IT objectives, including system consolidation, improved utilization of resources, and lower costs by implementing pools of compute, storage, and networking resources that can be shared by multiple applications and managed in a collective manner using policy-driven processes.

Converged infrastructure systems include information handling systems in which two or more distinct information handling resources are interconnected and validated by a vendor prior to deployment. A non-limiting example of a converged infrastructure system might comprise a modular chassis that include one or more modular compute enclosures, one or more network attached storage devices, and one or more switching resource. Hyper-converged systems include systems in which the virtualization of compute resources and the virtualization of storage resources are integrated into a software defined environment. Hyper-converged systems may be implemented as a group of off-the-shelf rack servers, each of which includes processing resources and direct attached storage resources.

Whether implemented in an enterprise's on-premises data center or, increasingly, a third party data center for providing outsourced, co-located, and/or cloud-based IT resources to an enterprise, managed infrastructure systems promote consolidation of IT resources and simplify IT management while facilitating improvements in utilization and cost reductions. However, the introduction of readily available, managed infrastructure systems has occurred comparatively recently. Accordingly, resources and techniques for managing the building, deployment, and operation of managed infrastructure systems are yet to be fully implemented and optimized.

Subject matter disclosed in this and other applications address numerous challenges associated with ensuring that: (a) managed infrastructure systems are properly built before being deployed, (b) properly-built managed infrastructure systems are properly deployed, and (c) properly-deployed managed infrastructure systems remain operational and continue to deliver an expected level of performance.

In accordance with subject matter disclosed herein, a method and system in accordance with the present teachings include an operational integrity and performance validation (OIPV) module suitable for performing operational integrity operations, performance validation operations, or both types of operations.

Operational integrity operations may access an operational integrity schema comprising a task manifest and a corresponding performance manifest. The task manifest identifies one or more operational tasks while the corresponding performance manifest includes performance thresholds for at least some of the operational tasks. The OIPV module may communicate with different types of infrastructure managers, portals, dashboards, or the like including, without limitation, infrastructure and virtual machine (I/VM) managers, private and public cloud portals and dashboards, and backup and disaster recovery (DR) managers. Each operation integrity schema may be associated with a particular infrastructure manager and the OIPV module may invoke the applicable infrastructure manager to perform the operational tasks listed in the operational integrity schema. The OIPV module may poll or otherwise monitor the applicable infrastructure manager for status information for each of the operational tasks. The OIPV module may also record completion status and time-to-complete information for each operational task. Should the OIPV module detect time-to-complete information that exceeds the applicable performance threshold, the OIPV module may record and/or report information pertaining to the particular operational task.

The performance validation operations of the OIPV module may access a performance validation manifest, indicative of one or more performance tests and one or more performance thresholds, and configure an image manifest of a benchmark image in accordance with the performance tests. The performance validation operations may interact with an infrastructure manager to deploy the benchmark image to a node or group of nodes under test and instruct an image agent of the benchmark image to execute performance tests in accordance with the deployed benchmark image(s). The performance validation operations may then obtain performance metrics from the image agent and make performance assessments in accordance with the metrics.

The various types of infrastructure managers that the OIPV module may communicate with include I/VM managers, public cloud portals, private cloud portals, and backup and DR managers. In the case of an I/VM manager configured to manage a data center or any other suitable assembly of converged and/or hyper-converged infrastructure, operational tasks which may be identified in an operational integrity schema include, among others, creating a virtual machine, migrating a virtual machine, creating a storage volume, migrating a storage volume, and creating a virtual network.

For embodiments in which the infrastructure manager comprises a private cloud portal, the OIPV module may adopt any one of two or more personas, including a tenant persona and an administrator persona, each associated with a corresponding operational integrity schema that identifies tasks appropriate for the applicable persona. Operational tasks identified in an operational integrity schema corresponding to a tenant persona may include tenant operations such as connecting to a self-service portal, creating a test user, self-subscribing to a tenant plan, creating virtual machines, creating virtual networks, connecting to tenant-created virtual machines, starting a tenant-created virtual machine, shutting down a tenant-created virtual machine, deleting tenant-created virtual machines, and recovering tenant-created virtual machines.

Operational tasks identified in an operational integrity schema corresponding to administrator persona embodiments may support administrative operations such as connecting to an administrative console, creating tenant plans, creating tenant networks, creating storage shares, invoking a maintenance mode for a compute node, live migrating a virtual machine, migrating a storage volume, VM and File level recovery operations, disaster recovery operations, and public cloud failover and failback operations.

For embodiments in which the infrastructure manager comprises a backup and disaster recovery manager, the operational tasks include tasks selected from performing backup and restore operations of an existing virtual machine and replicating/recovering a virtual machine to/from a secondary site.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an exemplary manifest for an operation integrity schema;

DETAILED DESCRIPTION

Figure 1:
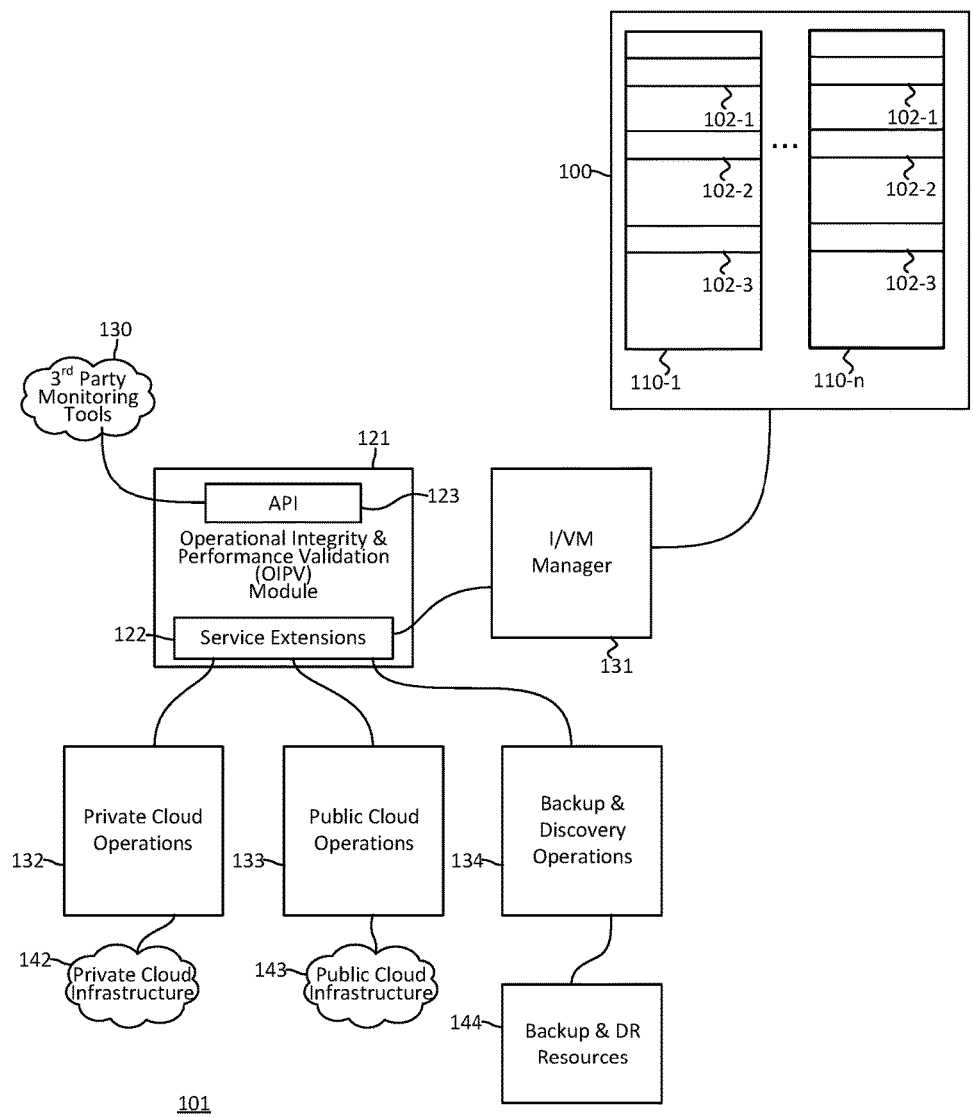
FIG. 1 illustrates a block diagram of an exemplary managed infrastructure platform including an operational integrity and performance validation module.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

Turning now to the drawings, FIG. 1 illustrates an exemplary implementation of a managed infrastructure platform 101 in which an OIPV module 121 is deployed in conjunction with one or more types of infrastructure management resources. The managed infrastructure platform 101 illustrated in FIG. 1 includes, among other infrastructure management resources, an infrastructure/virtual machine (I/VM) manager 131 coupled to information handling resources collectively identified as managed infrastructure 100. The managed infrastructure 100 illustrated in FIG. 1 may be referred to as a data center, which includes a plurality of rack cabinets 110, each of which may include one or more information handling resources 102.

In converged infrastructure embodiments of managed infrastructure 100, information handling resources 102 may include a plurality of different types of information handling resources, at least some of which may provide different functions and at least some of which may originate from different manufacturers. These disparate and heterogeneous information handling resources may be pre-configured with a validated infrastructure by a supplier or vendor. In converged infrastructure system embodiments, managed infrastructure 100 may be referred to herein as converged infrastructure 100.

In hyper-converged system embodiments of managed infrastructure 100, information handling resources 102 may represent different instances of a rack server or another off-the-shelf server component, each of which may include compute resources and direct attached storage resources. These similar and homogenous information handling resources may be pre-configured with a validated infrastructure by a supplier or vendor. In hyper-converged system embodiments, managed infrastructure 100 may be referred to herein as hyper-converged infrastructure 100.

Although FIG. 1 illustrates a data center example of managed infrastructure 100, it will be readily appreciated that, whether implemented with converged infrastructure, hyper-converged infrastructure, or another type of configuration, managed infrastructure 100 may include multiple instances of information handling resources 102, as well as additional types of information handling resources not depicted in FIG. 1.

Whether implemented with converged infrastructure, hyper-converged infrastructure, or otherwise, the infrastructure of managed infrastructure 100 may include, in addition to the physical hardware components, any and all software and/or firmware components, including BIOS firmware, operating system software, hypervisor software, and/or containerization software, as well as any management resources on any one or more of the information handling resources 102.

Although not explicitly depicted in FIG. 1, the information handling resources 102 in managed infrastructure 100 may include an endpoint management resource such as a service processor, baseboard management controller, or remote access controller. When an information handling resource 102 includes such an endpoint management resource, the endpoint management resource may communicate with a centralized and remote management system or server via communication paths that are out-of-band with respect to workload information exchange. The communication paths coupling the elements of FIG. 1 may encompass management communications, either in-band or out-of-band, as well as workload communications.

I/VM manager 131 may include or support features found in any of one or more commercially distributed infrastructure management software products or services including, without limitation, virtual machine managers and microservice/container clustering and/or orchestration frameworks. The managed infrastructure 100 illustrated in FIG. 1 may include or support virtualized, containerized, or other types of abstracted information handling resources. Likewise, I/VM manager 131 may include or support features for creating and managing abstracted resources. Accordingly, I/VM manager 131 may include or support features analogous to features found in any of various commercially deployed and/or publically available infrastructure management software products or services including, as non-limiting examples: Dell Active System Manager system management resources from Dell, Inc.; a vCenter server and/or VMware/vSphere management resources from VMware/Dell Technologies; Virtual Machine Manager (VMM)/System Center resources from Microsoft; Apache Mesos cluster management resources from the Apache Software Foundation; Kubernetes container management/orchestration resources from the Cloud Native Computing Foundation; Docker Swarm container clustering resources from Docker, Inc.; and vRealize cloud automation resources from VMware/Dell Technologies.

As indicated previously, the managed infrastructure platform 101 of FIG. 1 includes an OIPV module 121. OIPV module 121 may interact with any of various types of infrastructure management resources, which may be referred to herein more simply as infrastructure managers. The OIPV module 121 illustrated in FIG. 1, for example, includes services extensions 122 configured to or configurable to communicate with the I/VM manager 131 associated with managed infrastructure 100, the private cloud portal 132 associated with private cloud infrastructure 142, the public cloud portal 133 associated with public cloud infrastructure 143, and the backup and disaster recovery (DR) manager 134 associated with backup & DR resources 144. The OIPV module 121 may also communicate with one or more 3$^{rd}$ party monitoring tools 130 by way of an API 123.

Embodiments of OIPV module 121 include operational integrity features for ensuring that a managed infrastructure platform 101, which may sometimes be referred to herein as the deployed solution 101, continues to be able to perform functions within its original and intended capabilities. Embodiments of OIPV module 121 may further include performance validation features for ensuring that a cloud-deployed solution performs to one or more objectively verifiable benchmarks.

Figure 2:
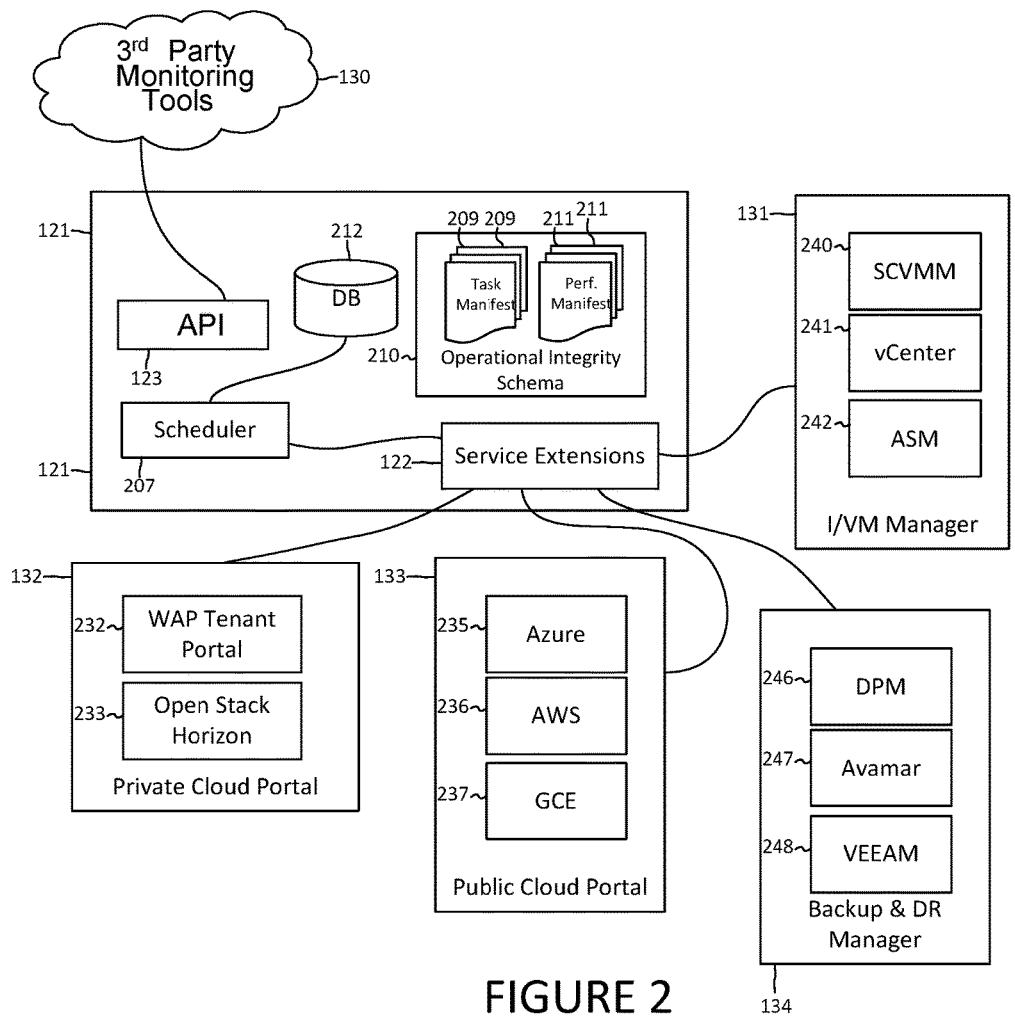
FIG. 2 illustrates additional detail of operational integrity and performance validation module.
Figure 6:
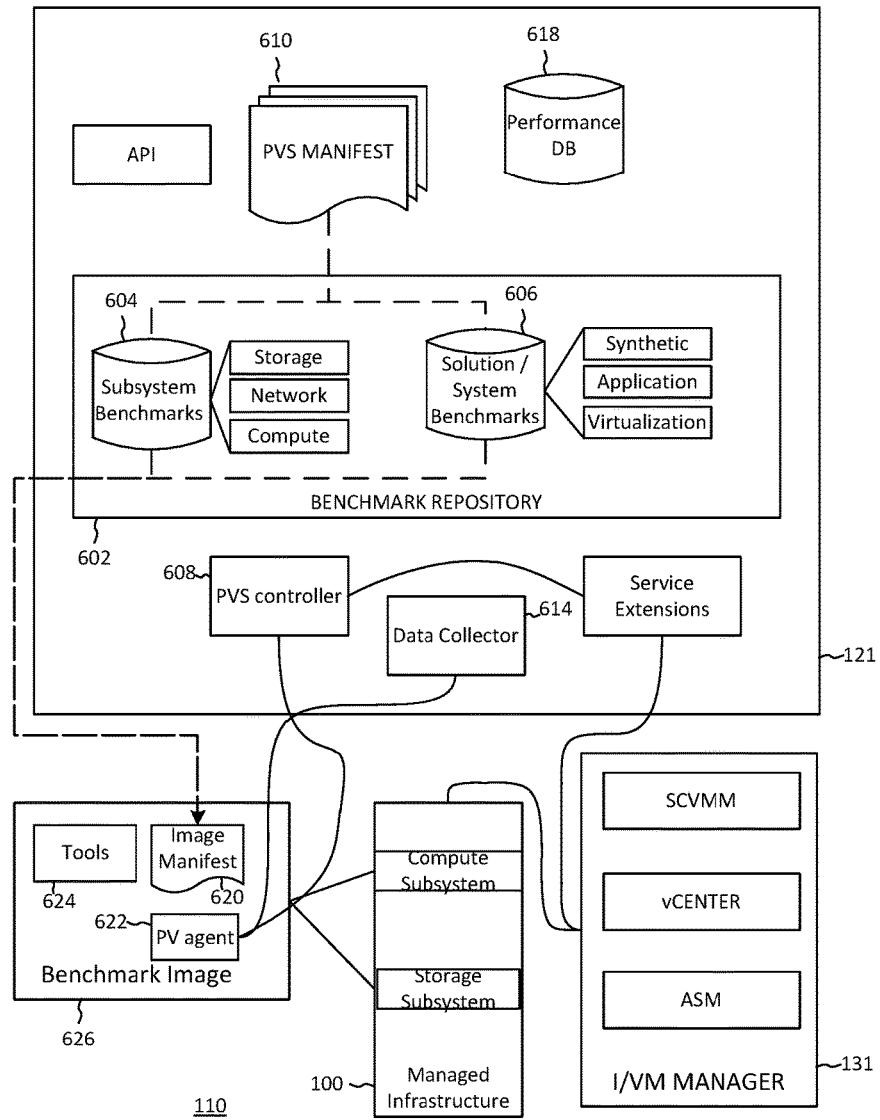
FIG. 6 illustrates performance validation elements of the operational integrity and performance validation module.

The illustration of OIPV module 121 in FIG. 2 emphasizes operational integrity features while the illustration of OIPV module 121 in FIG. 6 emphasizes performance validation features. Some embodiments of OIPV module 121 may include the operational integrity features of FIG. 2 while other embodiments may include the performance validation features of FIG. 6 and still other embodiments may include the operational integrity features emphasized in FIG. 2 as well as the performance validation features emphasized in FIG. 6. Although FIG. 2 emphasizes operational integrity features of OIPV module 121, the description of such features may include references to performance thresholds suggestive of features that measure or monitor characteristics other than or in addition to base functionality. Such terminology is consistent with inherent commonalities between performance and operational integrity or functionality and should not be construed as diminishing distinctions between features described in FIG. 6.

Turning now to operational integrity aspects of disclosed subject matter, one measure of a managed system is its ability to continuously perform its primary operational tasks in a timely manner. Referring to FIG. 2, a block diagram of OIPV module 121 emphasizing its operational integrity features is presented. The OIPV module 121 illustrated in FIG. 2 may be configured to validate tasks that any of the infrastructure managers (131 through 134) may be configured to carry out. In at least some embodiments, the OIPV module 121 of FIG. 2 may also measure or otherwise obtain one or more metrics associated with carrying out such tasks to ensure that the infrastructure's performance remains within historical or defined thresholds. OIPV module 121 may compare such metrics against previously recorded times or against pre-defined thresholds stored in one or more performance manifest(s) 211.

Embodiments of OIPV module 121 may execute operational integrity verification tasks from time to time, whether periodically or otherwise, and report back operational integrity information indicative of whether a particular operation completed successfully and whether completed operations were completed or otherwise carried out within an acceptable threshold.

The OIPV module 121 illustrated in FIG. 2 includes service extensions 122 configured to enable OIPV module 121 to communicatively couple to different types of infrastructure managers, including I/VM manager 131, private cloud portal 132, public cloud portal 133, and backup and DR manager 134.

The OIPV module 121 of FIG. 2 further includes a scheduler 207 configured to periodically perform a set of one or more operational tasks as defined in one or more task manifest(s) 209 of an operational integrity schema 210. Each task manifest 209 may list some or all of the operations a corresponding infrastructure manager needs to perform.

Referring momentarily to FIG. 3, an example task manifest 209 is illustrated. The task manifest 209 illustrated in FIG. 3 defines various tasks 301 including, in the illustrated example, VM creation task 301-1 and VM Network creation task 301-2. Task manifest 209 may further define various attributes 302 and sub-attributes 303 for each task 301. In the case of VM creation task 301-1, for example, task manifest 209 identifies a TestVM1 attributed 302-1, a template attributed 302-2 a Threshold attributed 304, and a VM Migration attribute 302-4. The TestVM1 attribute 302-1 defines attributes of the VM to be created, including a CPU attribute 303-1 specifying a particular processor type, a memory attribute 303-2 specifying a 4 GB system memory requirement, a disk attribute 303-3 specifying a 50 GB storage requirement, a network interface card (NIC) attribute 303-4 specifying a 10 Gb NIC requirement, and an availability attribute 303-5 specifying a highly-available requirement for the VM to be created.

The task manifest 209 of FIG. 3 further indicates a threshold attribute 302-3 specifying a 10 minute threshold for creating the specified volume. The threshold attribute 302-3 for VM Creation task 301-1 may trigger an exception, interrupt, corrective action, or some other response should the requested task fail to complete successfully within the specified threshold.

Returning to FIG. 2, the OIPV module 121 may leverage functionality embedded in any of the infrastructure managers 131-134 to carry out tasks in an automated manner. The OIPV module 121 may, for example, invoke I/VM manager 131, using an API provided by I/VM manager 131, to create a VM or perform any other suitable task listed in a task manifest 209.

The scheduler 207 may continuously poll one or more of the infrastructure managers 131 through 134 to capture information including, in at least some embodiment, the start time, a completion status, and an end time for each such operation. The OIPV module 121 may report the result of each task performed in its database 212 along with noting the time required to complete each such task. If the time required to complete a particular task exceeds a corresponding threshold noted in a performance manifest 211, OIPV module 121 may raise a flag that can be reported to a health portal (not depicted) or a 3rd party tool via API provided by the service.

OIPV module 121 may be configured to perform these operations at regular intervals, e.g., hourly, every 8 hours, twice a day at 9 AM and 4 PM, daily, weekly, etc., and store the resulting data in database 212 for subsequent use in trend analysis or to identify bottlenecks and classify them as transient, recurring, periodic, and so forth in accordance with historical data.

As previously indicated, the OIPV module 121 may be configured to measure or otherwise determine time and/or one or more other suitable performance attributes, while performing tasks. The OIPV module 121 may, as an example, measure the time required to create a VM, the time required to migrate a VM from an existing placement to a new placement, and so forth. The OIPV module 121 may compare any such performance data points against a performance manifest 211 that includes thresholds defining acceptable values of particular tasks. An initial set of values for attribute thresholds stored in performance manifest 211 may be generated based on a simulation or a validation carried on in a lab for specific infrastructure or for comparable infrastructure.

In at least some embodiments, OIPV module 121 is extensible to leverage third party monitoring tools 130.

Third party monitoring tools 130 may include tools for determining successful completion of various tasks and/or tools for measuring or otherwise determining various parameters of interest including time-to-complete, the amount of storage required, the number of compute cycles consumed, the amount of thermal energy generated, peak and/or average values of power while executing a particular task, the amount of available network communication capacity or bandwidth consumed, or any other suitable parameter of interested.

As suggested previously, OIPV module 121 may communicate with the infrastructure managers 131-134 including private cloud portal 132. Private cloud portal 132 may encompass a self-service portal, such as a Windows Azure Pack (WAP) Tenant portal 232, an OpenStack Horizon dashboard 233, or any other suitable tenant portal to carry out tenant related tasks.

The OIPV module 121 of FIG. 2 may also couple to and communicate with public cloud portal 131 to ensure that any hybrid operations or tasks are working and completing successfully. The public cloud portal 131 illustrated in FIG. 2 encompasses, as examples, user portals for Microsoft Azure 235, Amazon Web Services (AWS) 236, and Google Compute Engines (GCE) 237.

Examples of resources that may be included within I/VM manager 131 include a System Center Virtual Machine Manager module 240, a VMware vCenter server 241, and a Dell Active System Management (ASM) module 242.

As described with respect to FIG. 5 below, OIPV module 121 may be configured to communicate with backup and DR manager 134 to monitor functionality of backup/restoration resource (not depicted in FIG. 2). The backup and DR manager 134 illustrated in FIG. 2 may include, as examples, Data Protection Manger (DPM) resources 246, Avamar data backup with deduplication features 247, Veeam Backup and Disaster Recovery services 248, and/or other suitable backup/restore and DR resources.

Embodiments of OIPV module 121 may also support multiple roles, each role carrying out different set of operations. For example, in conjunction with interactions with private cloud portal 132, OIPV module 121 may include support for an administrator role that is configured to monitor and ensure operational integrity for carrying out administrative-tasks, such as monitoring the private cloud, ensuring that backup and disaster recovery mechanisms are operational, and confirming that subscriptions and plans being offered to tenants are operational etc.

The OIPV module 121 may also support operational integrity from the perspective of a private cloud tenant by verifying operations that a tenant is likely to use. Such operations might include the ability to subscribe to any plan offered, the ability to consume the services that the private/hybrid cloud provides, such as deploying infrastructure, applications, and/or platforms as services.

Figure 4:
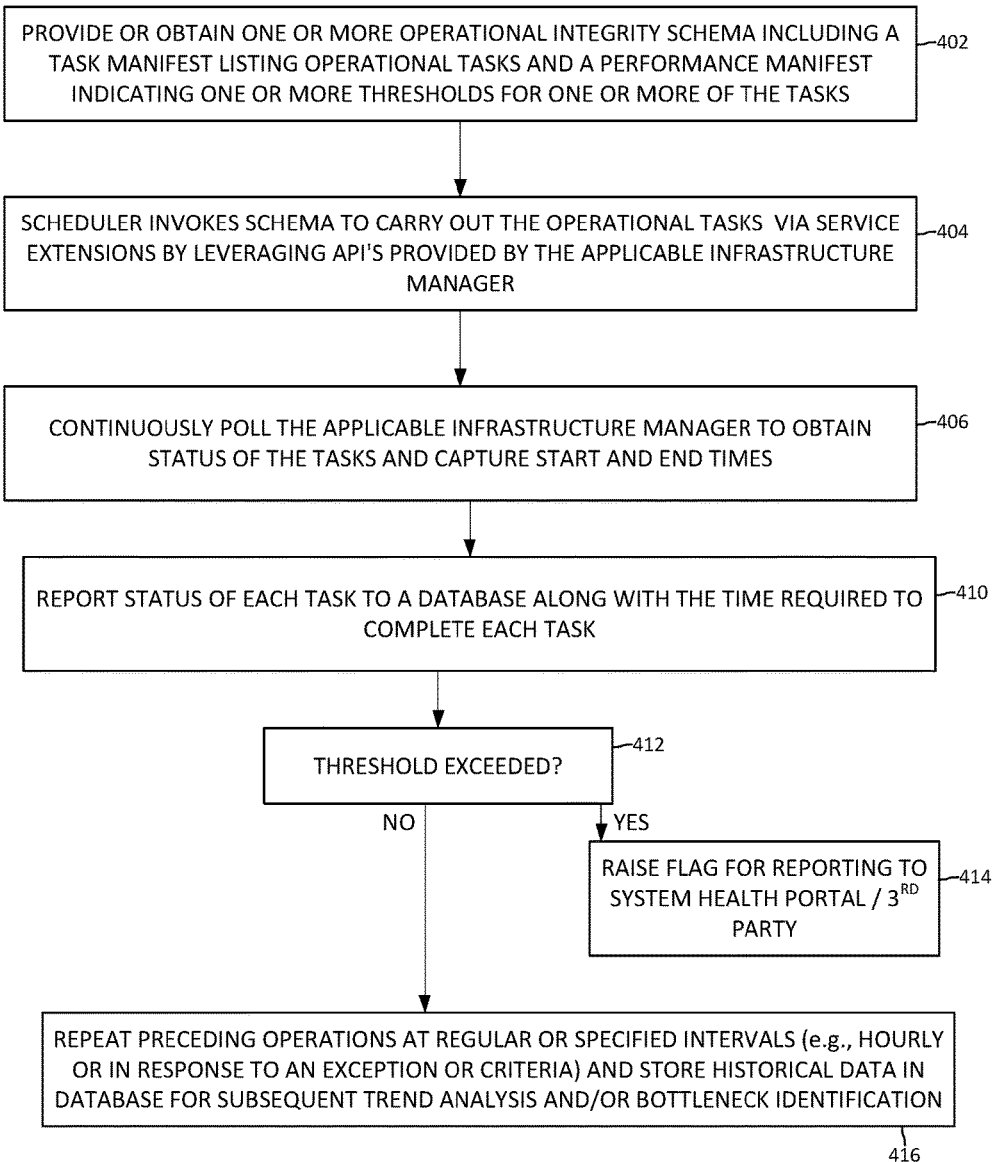
FIG. 4 illustrates a flow diagram of a method for monitoring and ensuring operational integrity.

Referring now to FIG. 4, a flow diagram illustrates a self-test process that may be performed by the OIPV module 121 of FIG. 1 and FIG. 2. The method 400 illustrated in FIG. 4 begins with the OIPV module 121 providing or obtaining (block 402) one or more operations schema, wherein each operations schema lists required operations, and one or more threshold schema, wherein each threshold schema lists expected thresholds for one or more of the operations. The scheduler 207 may then invoke (block 404) the schema to carry out the operational tasks via service extensions by leveraging API's provided by the applicable infrastructure manager. Subject to a timeout threshold, the OIPV module 121 may continuously poll (block 406) the applicable infrastructure manager to obtain status of the tasks and to capture start and end times. The OIPV module 121 may report (block 410) the status of each of each task in its database and noting the time it took to carry out each task. If (block 412) a threshold was exceeded during performance of a particular operation, a flag may be raised (block 414) for reporting to a system health portal and/or a third party. The process of blocks 402 through 414 may be repeated (block 416) at regular or specified intervals such as hourly or in response to some event, condition, or exception. The data acquired during each iteration may be stored in the database for accumulating trend analysis data and from which any bottlenecks may be identified and classified.

Figure 5:
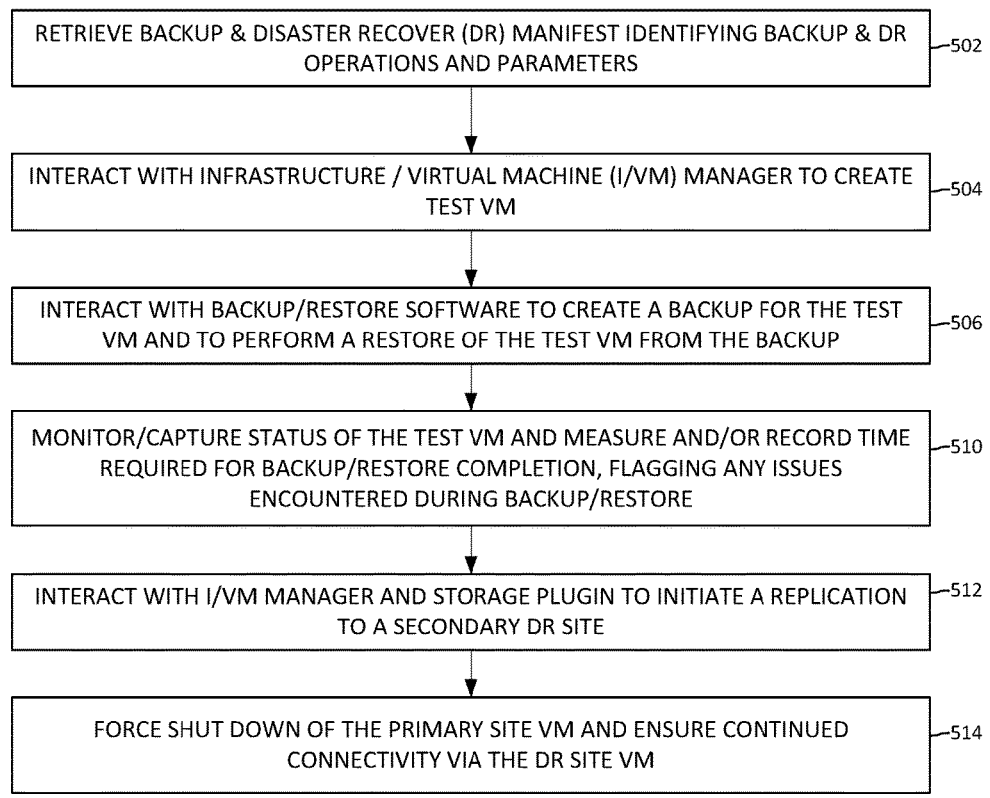
FIG. 5 illustrates a flow diagram of a method for monitoring and ensuring the operational integrity of backup and disaster recovery resources.

Referring now to FIG. 5, a flow diagram illustrates a process or method 500 for employing OIPV module 121 to perform operation integrity tasks pertaining to the backup/restoration and disaster recovery infrastructure depicted in FIG. 1. The method 500 illustrated in FIG. 5 includes retrieving (block 502) a backup and DR manifest identifying backup and DR operations, attributes, and values including, among others, an identification of a secondary DR site. The OIPV module 121 may then interact (block 504) with the I/VM manager 131 to create a test VM. The OIPV module 121 may then interact (block 506) with backup/restoration software to backup the newly created test VM and to restore the test VM from the backup. The OIPV module 121 may capture (block 508) the status of the test VM and measure the time required to complete the backup and restoration, flagging any issue that it may encounter. While the preceding description refers to backup and restore operations in combination and describes measuring the time required to perform both operations, other embodiments may confirm backup operations and restore operations, and their respective times to complete, separately.

With respect to disaster recovery, the method 500 illustrated in FIG. 5 may interact (block 510) with the I/VM manager and a storage plugin to initiate a replication to the secondary DR site. The OIPV module 121 may then force (block 512) a shutdown of the VM on the Primary site and ensure that the VM is remains available via the DR site VM.

Referring now to FIG. 6, performance validation elements of an OIPV module 121 are illustrated. Degradation in performance of even a single component may cause significant performance bottlenecks to the solution as a whole. In addition, anecdotal evidence suggests that comparable components from different manufacturers may exhibit different performance characteristics, e.g., hard disk drives (HDDs) and solid state drives (SSDs).

Whenever an infrastructure manager, such as the I/VM manager 131 of FIG. 1, is under heavy stress or sized incorrectly, it can cause the entire platform to experience undesirably long response times and to otherwise behave erratically.

The OIPV module 121 illustrated in FIG. 6 includes performance validation service (PVS) features, configurable to run either on-premises or in the cloud, to provide performance validation as a service. The PVS features illustrated in FIG. 6 include a benchmark repository 602, a PVS controller 608, a data collector 614, and a PVS manifest 610. The benchmark repository 602 illustrated in FIG. 6 includes subsystem benchmarks 604 and solution level benchmarks 606 enabling OIPV module 121 to test and validate performance at multiple levels of the infrastructure on which a private/hybrid cloud solutions is placed, as described below with respect to FIG. 7.

PVS manifest 610 may specify performance benchmarks that need to be performed against a solution under test, along with performance thresholds determined based on historical data and/or data captured in a lab prior to solution deployment. In conjunction with the various benchmarks available in benchmark repository 602, PVS manifest 610 may specify performance benchmarks for different levels of the system.

In at least one embodiment, PVS controller 608 may access PVS manifest 610 to update or otherwise configure an image manifest 620 within a benchmark image 626. PVS controller 608 may interact with I/VM manager 131 to deploy benchmark image 626. The benchmark image 626 may be deployed onto a physical, bare metal server or as a VM. The benchmark image 626 may include a PVS agent 622 that interacts with the PVS controller 612 and a data collector 614. Once the customized benchmark image 626 has been deployed across all the nodes under test, PVS controller 612 may instruct a PVS agent 622 within each benchmark image 626 to initiate testing. Each PVS agent 622 may execute performance tests in accordance with the image manifest 620 to carry out the requested tests.

Once performance validation execution is started, data collector 614 may periodically poll PVS agent 622 to collect performance metrics and store the collected metrics in performance database 618 and, optionally, to display performance metrics on a portal/console. PVS Controller 612 may also monitor the data and compare it against the thresholds. If it consistently sees one or more performance metrics not meeting corresponding thresholds, the applicable system or resource may be flagged for subsequent analysis.

Figure 7:
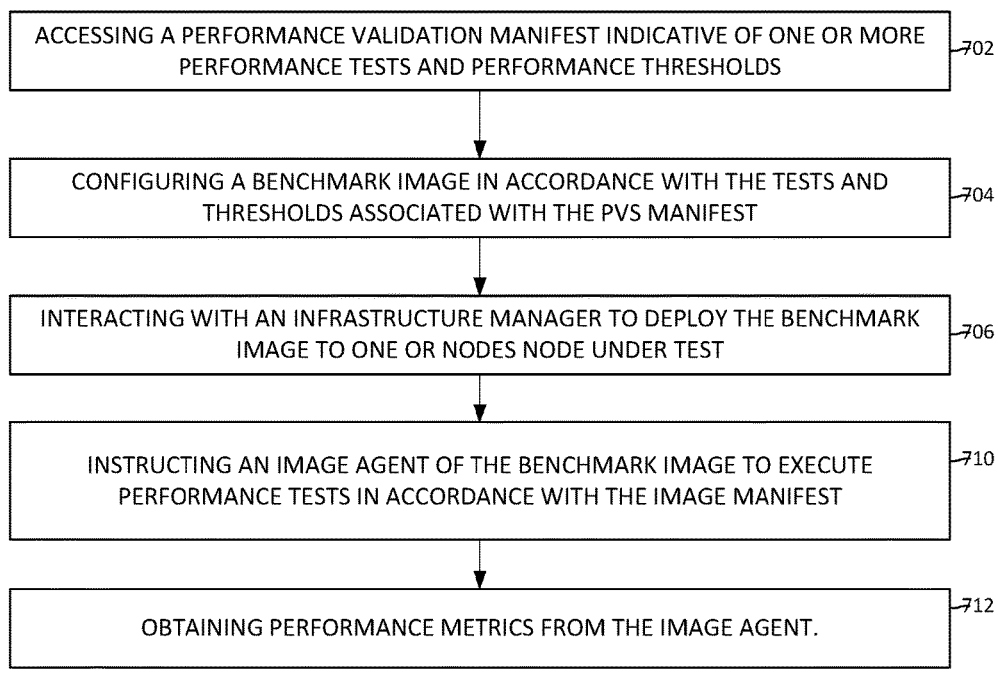
FIG. 7 illustrates a flow diagram of a performance validation process.

FIG. 7 illustrates a performance validation method 700 that may be implemented as an on-premises or cloud-based service performed by the OIPV module 121 illustrated in FIG. 6, or by another suitably configured resource, to validate performance attributes of the infrastructure on which a private/hybrid cloud solution is placed. In at least some embodiments, performance metrics at any level of the infrastructure, from individual component parameters to solution-level attributes, may be tested on one or more nodes, in parallel or serially, from a centralized resource.

A service suitable for performing the method illustrated in FIG. 7 may include a benchmark repository comprising a plurality of benchmarks including, in at least some embodiments, one or more component benchmarks, one or more subsystem benchmarks, and one or more solution level or system benchmarks.

The service may access (operation 702) a PVS manifest identifying one or more of the repository benchmarks and one or more corresponding performance thresholds to generate or otherwise configure (operation 704) a benchmark image in accordance with the performance tests and thresholds identified in the PVS manifest. The benchmark image may include an image manifest, an image agent, and benchmark tools that may be required to carry out tests.

The service may then interact (operation 706) with an I/VM manager 131 to deploy the benchmark image on one or more nodes. Once instances of the benchmark image have been deployed across all the nodes under test, a PVS controller may then instruct (operation 710) the image agents to execute the performance tests listed in their respective image manifests. The PVS agents carry out tests in accordance with the image manifests while a data collector may periodically poll the image agents to obtain (block 712) performance metrics.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method comprising:
 performing at least one of:
  operational integrity operations; and
  performance validation operations;
 wherein the operational integrity operations include:
  accessing an operational integrity schema, said schema including:
   a task manifest, associated with an infrastructure manager, identifying one or more operational tasks; and
   a performance manifest, corresponding to the task manifest, including one or more performance thresholds for the one or more of the operational tasks;
  invoking the infrastructure manager to perform the one or more operational tasks;
  monitoring the infrastructure manager for status information for the one or more operational tasks;
  recording a completion status and a time required to complete at least some of the one or more operational tasks; and
  responsive to detecting a time required to complete a particular operational task exceeding a corresponding performance threshold, reporting information pertaining to the particular operational task; and
 wherein the performance validation operations include:
  accessing a performance validation manifest indicative of one or more performance tests and performance thresholds;
  configuring an image manifest of a benchmark image in accordance with the performance validation manifest;
  interacting with an infrastructure manager to deploy the benchmark image to a node under test;
  instructing an image agent of the benchmark image to execute performance tests in accordance with the image manifest; and
  obtaining performance metrics from the image agent.

2. The method of claim 1, wherein the infrastructure manager comprises an infrastructure and virtual machine (I/VM) manager configured to manage managed infrastructure.

3. The method of claim 2, wherein the operational tasks include one or more tasks selected from:
   creating a virtual machine;
   migrating a virtual machine;
   creating a storage volume;
   migrating a storage volume; and
   creating a virtual network.

4. The method of claim 1, wherein the infrastructure manager comprises private cloud operations.

5. The method of claim 4, wherein the operational tasks include tenant operations including:
   connecting to a self-service portal;
   creating a test user;
   self-subscribing to a tenant plan;
   creating virtual machines;
   creating virtual networks;
   connecting to tenant-created virtual machines;
   starting a tenant-created virtual machine;
   shutting down a tenant-created virtual machine;
   deleting tenant-created virtual machines; and
   recovering tenant-created virtual machines.

6. The method of claim 4, wherein the operational tasks include administrative operations comprising:
   connecting to an administrative console;
   creating tenant networks;
   creating storage shares;
   invoking a maintenance mode for a compute node;
   live migrating a virtual machine;
   storage migrating a storage volume; and
   creating tenant plans.

7. The method of claim 1, wherein the infrastructure manager comprises a backup and disaster recovery manager.

8. The method of claim 7, wherein the operational tasks include tasks selected from:
   performing at least one of:
      creating a backup of an existing virtual machine; and
      restoring a virtual machine from an existing backup; and
   replicating a virtual machine on a secondary site.

9. An information handling system comprising:
   a processor; and
   computer readable storage medium including processor executable instructions that, when executed by the processor cause the processor to perform operations comprising:
   performing at least one of:
      operational integrity operations; and
      performance validation operations;
   wherein the operational integrity operations include:
      accessing an operational integrity schema, said schema including:
         a task manifest, associated with an infrastructure manager, identifying one or more operational tasks; and
         a performance manifest, corresponding to the task manifest, including one or more performance thresholds for the one or more of the operational tasks;
      invoking the infrastructure manager to perform the operational tasks;
      monitoring the infrastructure manager for status information for each of the operational tasks;
      recording a completion status and a time required to complete each operational task; and
      responsive to detecting a time required to complete a particular operational task exceeding a corresponding performance threshold, report information pertaining to the particular operational task; and
   wherein the performance validation operations include:
      accessing a performance validation manifest indicative of one or more performance tests and performance thresholds;
      configuring an image manifest of a benchmark image in accordance with the performance validation manifest;
      interacting with an infrastructure manager to deploy the benchmark image to a node under test;
      instructing an image agent of the benchmark image to execute performance tests in accordance with the image manifest; and
      obtaining performance metrics from the image agent.

10. The information handling system of claim 9, wherein the infrastructure manager comprises an infrastructure and virtual machine (I/VM) manager configured to manage managed infrastructure.

11. The information handling system of claim 10, wherein the operational tasks include one or more tasks selected from:
   creating a virtual machine;
   migrating a virtual machine;
   creating a storage volume;
   migrating a storage volume; and
   creating a virtual network.

12. The information handling system of claim 9, wherein the infrastructure manager comprises a private cloud portal.

13. The information handling system of claim 12, wherein the operational tasks include tenant operations including:
   connecting to a self-service portal;
   creating a test user;
   self-subscribing to a tenant plan;
   creating virtual machines;
   creating virtual networks;
   connecting to tenant-created virtual machines;
   starting a tenant-created virtual machine;
   shutting down a tenant-created virtual machine;
   deleting tenant-created virtual machines; and
   recovering tenant-created virtual machines.

14. The information handling system of claim 12, wherein the operational tasks include administrative operations comprising:
   connecting to an administrative console;
   creating tenant networks;
   creating storage shares;
   invoking a maintenance mode for a compute node;
   live migrating a virtual machine;
   storage migrating a storage volume; and
   creating tenant plans.

15. The information handling system of claim 9, wherein the infrastructure manager comprises a backup and disaster recovery manager.

16. The information handling system of claim 15, wherein the operational tasks include tasks selected from:
   performing a backup of an existing virtual machine;
   restoring a virtual machine from an existing backup; and
   replicating a virtual machine on a secondary site
   forcing a shutdown of the virtual machine on the secondary site and ensuring availability of the virtual machine via the secondary site.

17. A non-transitory computer readable medium, comprising processor executable instructions that, when executed by the processor cause the processor to perform operations comprising:
   performing at least one of:

operational integrity operations; and
performance validation operations;
wherein the operational integrity operations include:
    accessing an operational integrity schema, said schema including:
        a task manifest, associated with an infrastructure manager, identifying one or more operational tasks; and
        a performance manifest, corresponding to the task manifest, including one or more performance thresholds for the one or more of the operational tasks;
    invoking the infrastructure manager to perform the operational tasks;
    monitoring the infrastructure manager for status information for each of the operational tasks;
    recording a completion status and a time required to complete each operational task; and
    responsive to detecting a time required to complete a particular task exceeding a corresponding performance threshold, report information pertaining to the particular operational task; and
wherein the performance validation operations include:
    accessing a performance validation manifest indicative of one or more performance tests and performance thresholds;
    configuring an image manifest of a benchmark image in accordance with the performance validation operations;
    interacting with an infrastructure manager to deploy the benchmark image to a node under test and execute;
    instructing an image agent of the benchmark image to execute performance tests in accordance with the image manifest; and
    obtaining performance metrics from the image agent.

18. The computer readable medium of claim 17, wherein the infrastructure manager comprises an infrastructure and virtual machine (I/VM) manager configured to manage managed infrastructure.

19. The computer readable medium of claim 18, wherein the operational tasks include one or more tasks selected from:
creating a virtual machine;
migrating a virtual machine;
creating a storage volume;
migrating a storage volume; and
creating a virtual network.

20. The computer readable medium of claim 17, wherein the infrastructure manager comprises private cloud operations and wherein the operational tasks include tenant operations comprising:
connecting to a self-service portal;
creating a test user;
self-subscribing to a tenant plan;
creating virtual machines;
creating virtual networks;
connecting to tenant-created virtual machines;
starting a tenant-created virtual machine;
shutting down a tenant-created virtual machine;
deleting tenant-created virtual machines; and
recovering tenant-created virtual machines.

* * * * *